US008924168B2

(12) United States Patent
Manoosingh et al.

(10) Patent No.: US 8,924,168 B2
(45) Date of Patent: Dec. 30, 2014

(54) METHOD AND SYSTEM TO DETECT ACTUATION OF A SWITCH USING VIBRATIONS OR VIBRATION SIGNATURES

(75) Inventors: Lane Leslie Manoosingh, Marietta, GA (US); Ryan Marc LaFrance, Marietta, GA (US)

(73) Assignee: General Electric Company, Schenectady, NY (US)

(*) Notice: Subject to any disclaimer, the term of this patent is extended or adjusted under 35 U.S.C. 154(b) by 795 days.

(21) Appl. No.: 13/014,742

(22) Filed: Jan. 27, 2011

(65) Prior Publication Data

US 2012/0197556 A1 Aug. 2, 2012

(51) Int. Cl.
*G01H 17/00* (2006.01)
*G06F 19/00* (2011.01)
*H01H 9/16* (2006.01)

(52) U.S. Cl.
CPC ................. *H01H 9/16* (2013.01); *H01H 9/168* (2013.01); *H01H 9/167* (2013.01)
USPC ................................................ 702/56

(58) Field of Classification Search
USPC ......................................... 702/54, 56; 73/649
See application file for complete search history.

(56) References Cited

U.S. PATENT DOCUMENTS

| | | | | |
|---|---|---|---|---|
| 4,956,999 | A | 9/1990 | Bohannan et al. | |
| 4,980,844 | A | 12/1990 | Demjanenko et al. | |
| 5,251,151 | A | 10/1993 | Demjanenko et al. | |
| 6,089,092 | A * | 7/2000 | Shinohara et al. | 73/514.01 |
| 6,265,979 | B1 * | 7/2001 | Chen et al. | 340/601 |
| 2003/0079774 | A1 * | 5/2003 | Reyman | 137/38 |
| 2004/0141420 | A1 | 7/2004 | Hardage et al. | |
| 2005/0168891 | A1 | 8/2005 | Nilman-Johnsson et al. | |
| 2011/0000772 | A1 | 1/2011 | Hanai et al. | |
| 2011/0170377 | A1 * | 7/2011 | Legaspi | 367/199 |

FOREIGN PATENT DOCUMENTS

| | | | |
|---|---|---|---|
| DE | 10 2005 047 740.2 | A1 | 4/2007 |
| EP | 0 22 671 | A1 | 1/1981 |
| EP | 2 267 739 | A1 | 12/2010 |
| EP | 2 405 454 | A1 | 1/2012 |
| WO | 97/43729 | A1 | 11/1997 |
| WO | 2010/081982 | A1 | 7/2010 |
| WO | 2007/036540 | A1 | 1/2013 |

OTHER PUBLICATIONS

A.A. Polycarou, Event Timing and Shape Analysis of Vibration Bursts From Power Circuit Breaker, 1996, IEEE, vol. 11.*
B. Judd, Using Accelerometers in a Data Acquisition System, 2007, United Electronics Industries.*
Search Report issued in Connection with EP Application No. 12152341.9, Jan. 28, 2013.
U.S. Appl. No. 13/014,746, filed Jan. 27, 2011, Ryan Marc LaFrance.

* cited by examiner

*Primary Examiner* — John Breene
*Assistant Examiner* — Yaritza H Perez Bermudez
(74) *Attorney, Agent, or Firm* — Fletcher Yoder, P.C.

(57) ABSTRACT

Described herein are embodiments of methods and systems to detect actuation of a switch using vibrations and vibration signatures. One aspect of the method comprises sending an actuation signal to a switch, receiving a vibration signal associated with the switch, and determining from the vibration signal whether the actuation occurred.

31 Claims, 8 Drawing Sheets

METHOD AND SYSTEM TO DETECT ACTUATION OF A SWITCH USING VIBRATIONS OR VIBRATION SIGNATURES

CROSS-REFERENCE TO RELATED APPLICATION

This application is related to U.S. patent application Ser. No. 13/014,746, filed on Jan. 27, 2011, which is fully incorporated herein by reference and made a part hereof.

BACKGROUND OF THE INVENTION

In many instances, utility providers desire to electronically communicate with the utility service meters for numerous purposes including scheduling disconnection or connection of utility services to the metered loads, automatic meter reading (AMR), load shedding and load control, automatic distribution and smart-grid applications, outage reporting, providing additional services such as Internet, video, and audio, etc. In many of these instances, to perform these functions the meters must be configured to communicate with one or more computing devices through a communications network, which can be wired, wireless or a combination of wired and wireless, as known to one of ordinary skill in the art.

In many instances, such meters are equipped with an electromechanical switch that can be actuated remotely to perform functions such as disconnection or connection of utility services to the metered loads, load shedding and load control, and the like. Generally, determination of switch actuation is accomplished by detecting the presence, or absence, of the utility service on the load side of the meter. For example, if the utility service provided is electricity, then operation of the switch is determined through electronic acknowledgement of switch actuation by means of detection of current flow (or detecting absence of current flow) on the load side meter terminals. Similarly, services such as gas or water can be detected by detecting flow (or absence of flow) on the load side of the meter. However, by using only a single method of feedback i.e. electronic, errors are possible, exposing field technicians and property owners to dangerous situations and meter manufactures to safety liability.

Therefore, systems and methods are desired that provide reliable acknowledgment of switch actuation that overcome challenges present in the art, some of which are described above.

BRIEF DESCRIPTION OF THE INVENTION

Described herein are embodiments of methods and systems for detection of actuation of a switch. In general, embodiments of the present invention provide an improvement over current methods of detection of switch actuation by providing a method of determining switch actuation using a vibration signal.

One aspect of the method comprises sending an actuation signal to a switch, receiving a vibration signal, and determining from the vibration signal whether the actuation occurred.

Another aspect of the present invention comprises a system. One embodiment of the system is comprised of a meter. The meter is associated with a switch configured to be actuated remotely. Further comprising the system is an accelerometer. The accelerometer produces a vibration signal that can be analyzed to determine whether an actuation of the switch occurred.

Yet another aspect of the present invention comprises a system comprised of a meter and a computing device. The meter is comprised of a switch configured to be actuated remotely and an accelerometer. The accelerometer produces a vibration signal that can be analyzed to determine whether an actuation of the switch occurred. The computing device is operably connected with the meter. The computing device is configured to send an actuation signal to the switch, receive the vibration signal from the accelerometer associated with the switch, and determine from the vibration signal whether the actuation occurred.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
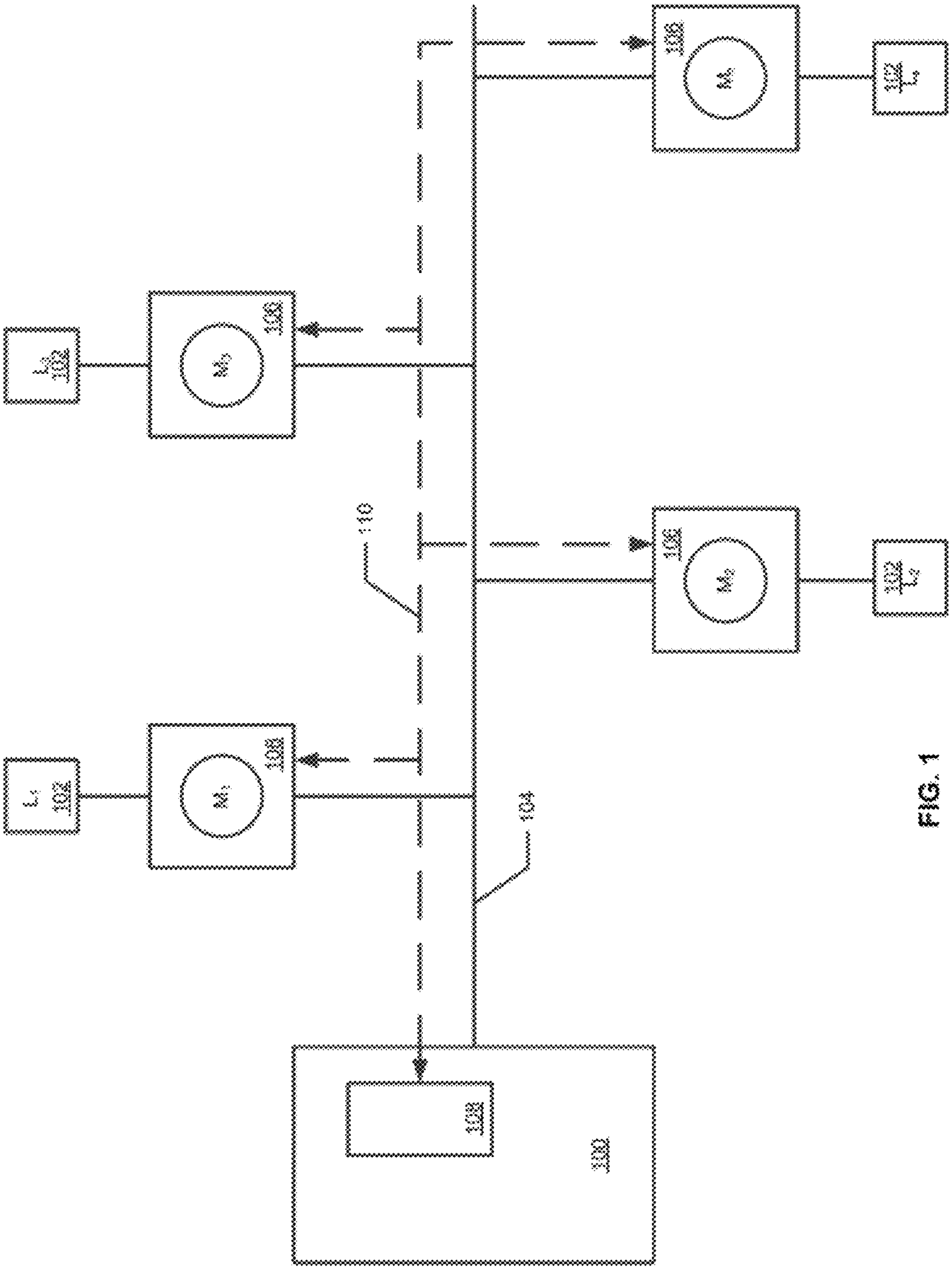
FIG. 1 is a block diagram of a section of an exemplary utility distribution system.

Referring to FIG. 1, an illustration of one type of system that would benefit from embodiments of the present invention is provided. FIG. 1 is a block diagram of a section of an exemplary utility distribution system such as, for example, an electric, water or gas distribution system. However, embodiments of the present invention can be used to benefit any meter that uses electromechanical switches to connect or disconnect a delivered service or product. As shown in FIG. 1, a utility service is delivered by a utility provider 100 to various loads $L_1$-$L_n$ 102 through a distribution system 104. In one aspect, the utility service provided can be electric power. Consumption and demand by the loads 102 can be measured at the load locations by meters $M_1$-$M_n$ 106. If an electric meter, the meters 106 can be single-phase or poly-phase electric meters, as known to one of ordinary skill in the art, depending upon the load 102. While consumption or demand information is used by the utility provider 100 primarily for billing the consumer, it also can be used for other purposes including planning and profiling the utility distribution system. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the meters 106 must be configured to communicate with one or more computing devices 108 through a communications network 110, which can be wired, wireless or a combination of wired and wireless, as known to one of ordinary skill in the art. Such meters 106 can be equipped with switches that can be used to remotely connect or disconnect the service or product delivered.

Therefore, it is desired that the meters 106 of a system such as that shown in FIG. 1 are configured to have capabilities beyond that of mere measurement of utility service consumption. Described herein are embodiments of methods and systems for detection of actuation of a switch associated with a meter. In general, the technical effect of embodiments of the present invention provide an improvement over current methods of detection of switch actuation by providing a method of determining whether a switch actuated using vibrations or a vibration signature. In one aspect, a system and method of obtaining mechanical acknowledgement of switch actuation and position via the use of a accelerometer is described. In one aspect, the accelerometer is a microelectromechanical systems (MEMS) accelerometer. In one aspect, the main board of a meter 106 is populated with a MEMS accelerometer that acts as an "electronic ear" to provide reliable acknowledgement of switch actuation events. In one aspect, a vibration signal associated with switch actuation is compared to signatures of possible switch actuation events (opening, closing, etc.) and through digital signal analysis, it can be determined if and when a switch has been actuated to, but not limited to, a closed or open position. The MEMS accelerometer acts as the "ear" of a field technician, listening for verification that the meter's remote switch functioned properly when interrogated. This data may be stored on board the meter and can also be transmitted back to the service provider. Embodiments of the invention described herein are not limited to any specific metering technology. (e.g. electric, gas, water, etc.)

Figure 2:
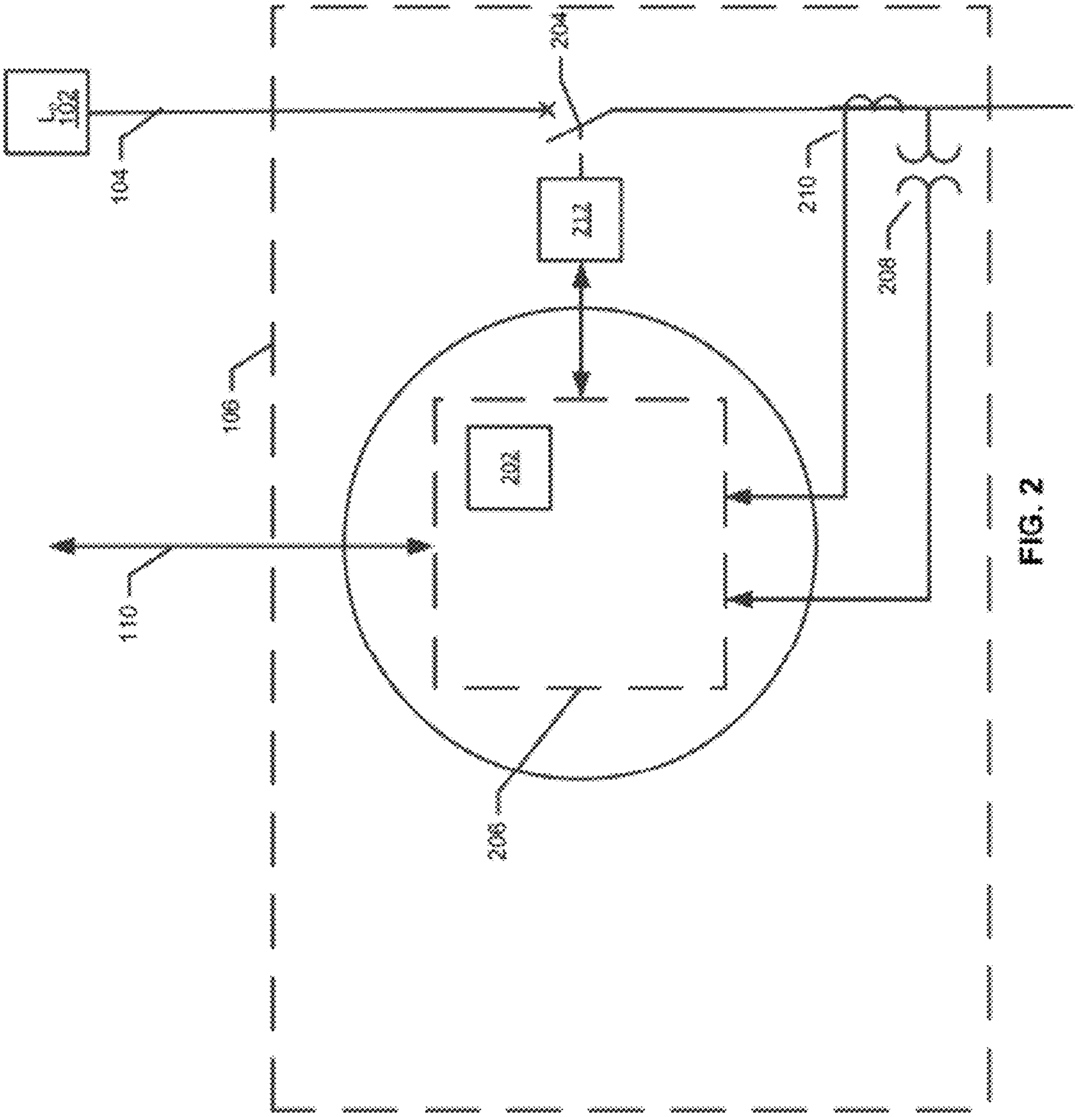
FIG. 2 illustrates overview block diagram of an embodiment of a meter further comprising an accelerometer for detecting switch actuation.

FIG. 2 illustrates overview block diagram of an embodiment of a meter 106 further comprising an accelerometer 202 for producing a vibration signal that can be used for detecting switch 204 actuation. In this exemplary embodiment, the utility service is electric power, though other meters for utility services such as water, natural gas, and the like are contemplated within the scope of embodiments of the present invention. Analog voltage and current inputs are provided to meter electronics 206. The analog signals are derived from an electrical power feed 104. Generally, the electrical power feed 104 is an alternating current (AC) source. In one aspect, the power feed 104 is a single-phase power feed. In another aspect, the power feed 104 is a poly-phase (e.g., three-phase) power feed. In one aspect, the electrical power feed 104 can be the one being metered by the meter 106. In another aspect, the input voltage and input current analog signals can be derived from other electrical sources. In one aspect, the analog voltage signal can be provided by one or more potential transformers (PT) 208, if needed, though other means such as a voltage divider, capacitive coupling, or the like can be used. If the voltage level of the source is sufficiently low (e.g., 0.25 volts AC, or lower), then a PT 208 or other means of stepping down or transforming the voltage can be omitted. Similarly, in one aspect, the analog current signal can be provided by one or more current transformers (CT) 210. In one aspect, the one or more CTs 210 can have a turns ratio of 1:2500. In one aspect, one or more resistors (not shown) can be used to convert the current signal from the CT 210 into a voltage signal. In one aspect, the actuation detection comprises an accelerometer 202 and the meter electronics 206. In one aspect, the accelerometer 202 produces vibration signals. These vibration signals can be analyzed to determine whether the switch 204 responded to an actuation command. For example, the vibration signal produced by the accelerometer 202 can be compared to known vibration signatures for opening or closing the switch 204 to determine whether the switch 204 responded to a remote command. In one aspect, the accelerometer 202 produces a vibration signal only if the peak amplitude of vibration meets or exceeds a threshold, or if the duration of vibration meets or exceeds a time limit. In one aspect, the accelerometer 202 is a MEMS accelerometer.

A remote switch actuation signal is received by the meter electronics 206 over a network 110. The meter electronics 206 cause a control 212 to operate the switch 204 in accordance with the actuation signal. Actuation can comprise a connection or disconnection of a utility service such as the power feed 104 using a switch 204 associated with the meter 106. For example, in one aspect the meter 106 comprises a load control unit (e.g., relays) 212 to control the consumption of the utility service by the load 102. In some instances there can be requirements by various utilities to connect or disconnect the load 102 in a random manner to help avoid imbalances and fluctuations on the utility distribution system.

Further comprising the embodiment of FIG. 2 are the meter's electronics 206. In one aspect, the electronics 206 comprise at least a memory, and one or more processors and provide an interface for receiving a signal from the network 110 and causing the switch 204 to actuate via the control 212. The memory of the meter electronics 206 can be used to store a recorded vibration signal as received from the accelerometer 202. The meter electronics 206 can comprise a transmitter that can be used to transmit the vibration signal from the accelerometer 202 over the network 110 to a separate computing device 108. In one aspect, the meter electronics 206 in association with the accelerometer 202 can be used to produce a vibration signal only if the peak amplitude of vibration meets or exceeds a threshold, or if the duration of vibration meets or exceeds a time limit. The vibration signal can be analyzed to determine whether an actuation of the switch 204 occurred. In one aspect, the vibration signal can be compared to known vibration signatures for opening or closing the switch 204 to determine whether the switch 204 responded to a remote command. In one aspect, the meter's electronics 206 can comprise one or more metering micro-controllers including a Teridian 6533 controller or a Teridian 6521 controller as are available from Maxim Integrated Products, Inc. (Sunnyvale, Calif.), among others.

Figure 3:
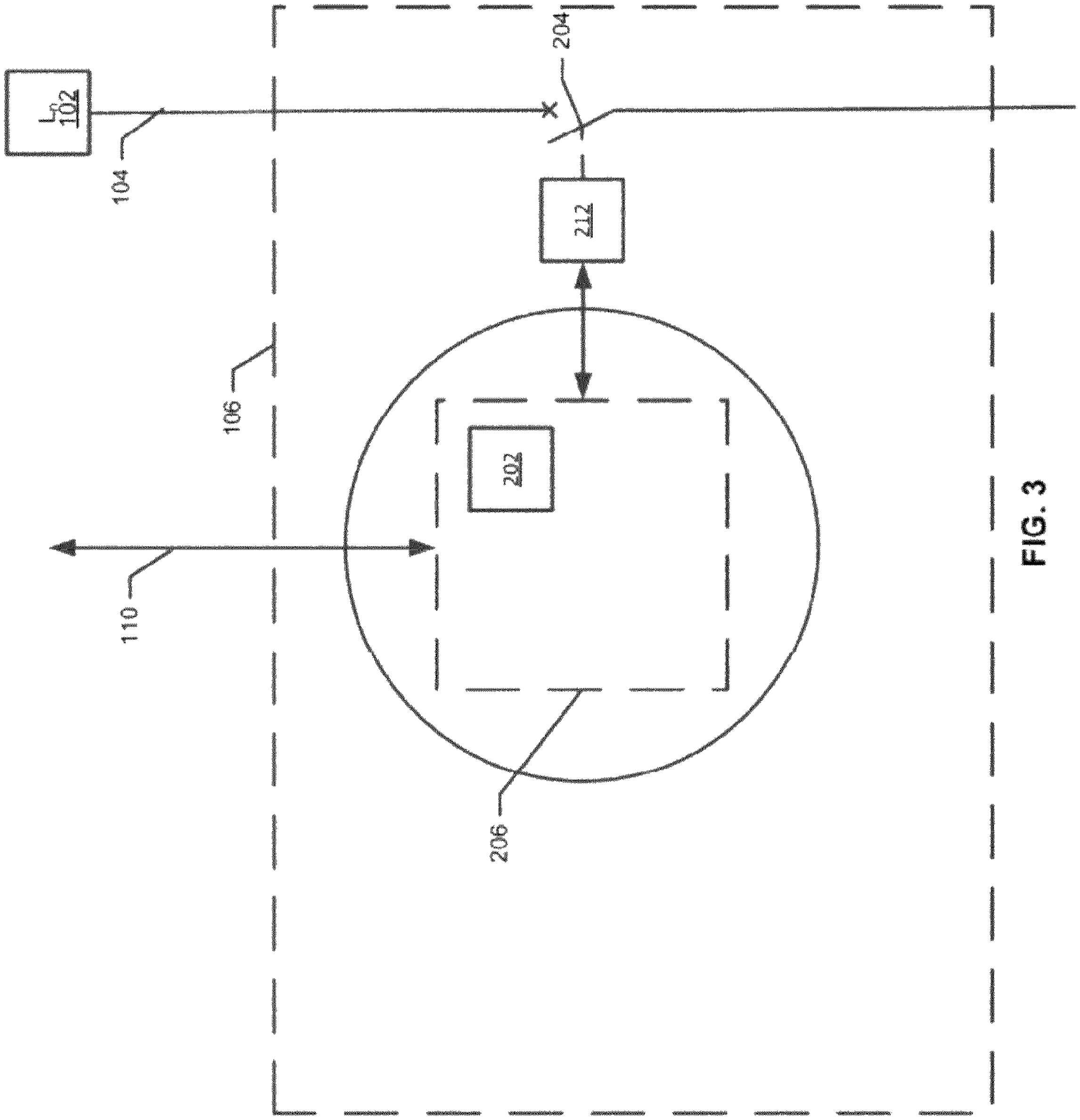
FIG. 3 illustrates another overview block diagram of an embodiment of a meter further comprising an accelerometer for detecting switch actuation.

FIG. 3 illustrates another overview block diagram of an embodiment of a meter 106 further comprising an accelerometer 202 for detecting switch 204 actuation. FIG. 3 illustrates a system comprised of a meter 106. The meter 106 can be used to measure consumption of various different services or products such as electricity, gas, water, and the like. In one aspect, the meter 106 is associated with a switch 204. The switch 204 is configured to be actuated remotely by an actuation signal received by the meter's electronics 206 and implemented using a control 212. In one aspect, actuating the switch 204 remotely comprises sending one of an "open" or a "close" signal to the switch 204. The system is further comprised of an accelerometer 202. In one aspect, the accelerometer is a MEMS accelerometer. The accelerometer produces vibration signals associated with the meter 106. For example, actuation of the switch 204 can cause vibration of the switch 204 and the meter 106, which causes the accelerometer 202 to produce a vibration signal. In one aspect, the vibration signal can be analyzed to determine whether an actuation of the switch 204 occurred. In one aspect, the vibration signal can be filtered prior to analysis. In one aspect, the vibration signals from the accelerometer can be digitally filtered to reduce unanticipated and undesired results, such as, but not limited to, noise. In various aspects, the type of digital filtering can include, but is not limited to, Infinite Impulse Response (IIR) and Finite Impulse Response (FIR) filters, as known to one of ordinary skill in the art. In one aspect, a digital filter comprises part of the meter's electronics 206. In one aspect, a digital filter comprises a part of a computing device 108 that receives vibration signals. In one aspect, analyzing the vibration signal to determine whether actuation of the switch occurred comprises analyzing the vibration signal using time-domain analysis to determine whether the actuation occurred. In another aspect, analyzing the vibration signal to determine whether actuation of the switch occurred comprises analyzing the vibration signal using frequency-domain analysis to determine whether the actuation occurred. Notwithstanding the technique used, the vibration signal received from the accelerometer 202 can be compared against known switch actuation signatures to determine whether the switch 204 actuated in accordance with an actuation command or signal.

In one aspect, the system is further comprised of a transmitter and a computing device 108. The transmitter can used to transmit the vibration signal to the computing device 108 and the computing device 108 can be used to analyze the vibration signal to determine whether actuation of the switch 204 occurred, including comparing a vibration signal against known switch actuation signatures to determine whether the switch 204 actuated in accordance with an actuation command or signal. In one aspect, comparing a vibration signal against known switch actuation signatures to determine whether the switch 204 actuated in accordance with an actuation command or signal comprises matching a vibration signal to a given signature by comparing the amplitudes and time deltas between vibration peaks of the vibration signal and the known switch actuation signatures. Alternatively, in one aspect using time-domain analysis, operations such as, but not limited to, cross-correlation and circular cross-correlation, can be used to form a positive match between the vibration signal and the known switch actuation signatures. In one aspect, the vibration signals may or may not be normalized; that is, the signals may be offset such that the average value is 0. This normalization reduces the chance of false positives in some cases.

Figure 4:
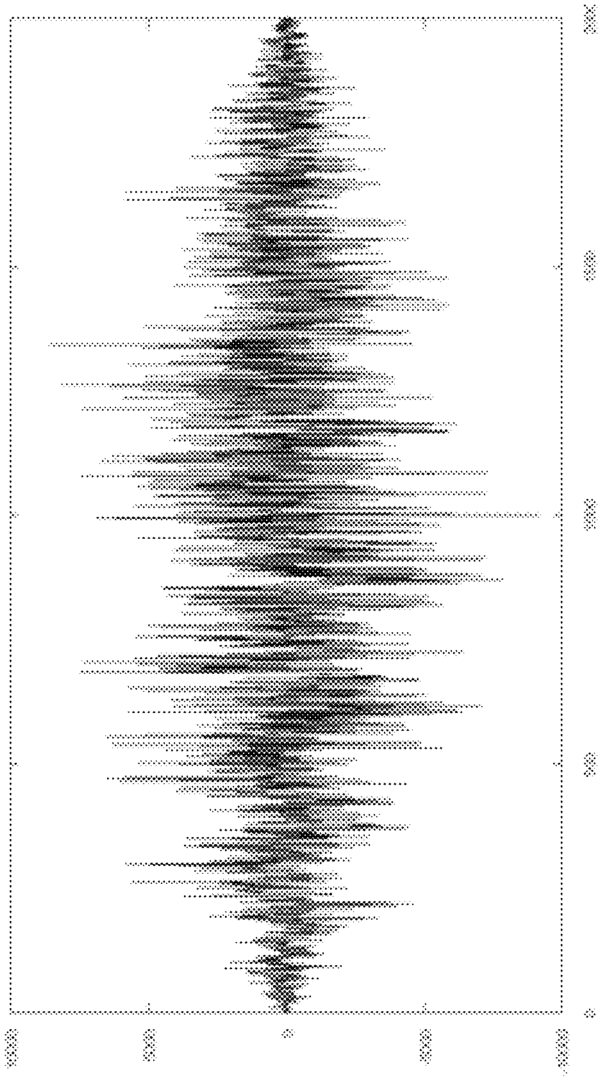
FIG. 4 is an exemplary illustration of cross-correlation of two random signals.
Figure 5:
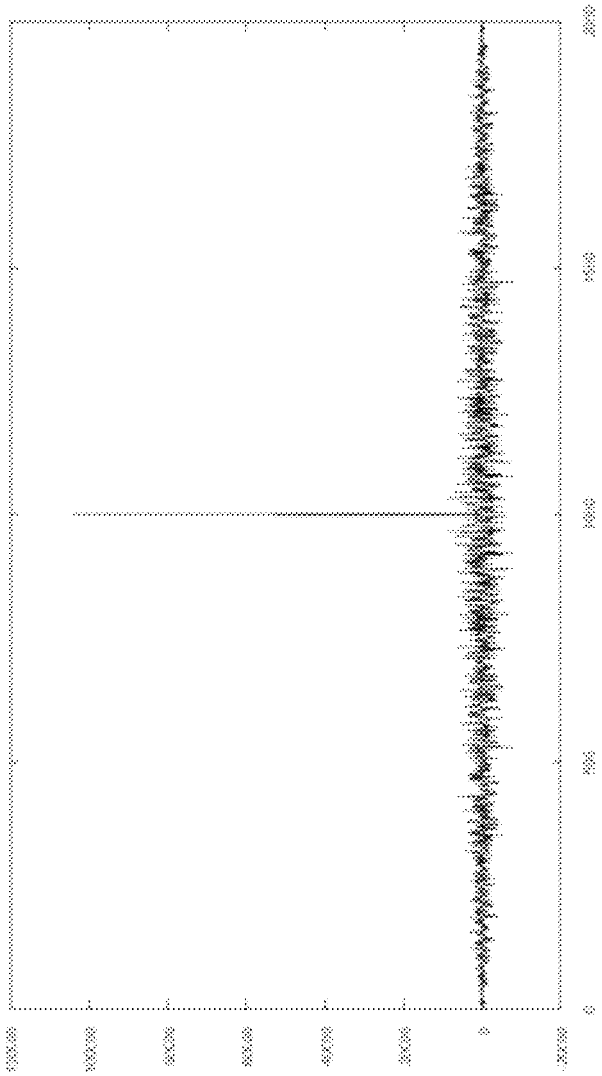
FIG. 5 is an exemplary illustration of auto-correlation of a random signal with itself.

When using cross-correlation, or circular cross-correlation, the output should be monitored for a value, or "spike", above a given threshold. The value of the threshold can be determined by experimentation, length of the signal, and amplitude range of the signals in comparison. If there is a value above a threshold when the cross correlation between a signal and a given signature is performed, then a match is said to be made. For example, if a signal is generated at random and cross correlated with another signal that is generated at random then the result of the cross correlation between the two signals will likely resemble the signal of FIG. 4. If a one of those random signals is cross-correlated with itself, the result of the autocorrelation (or cross correlation of a signal with itself) will likely resemble the signal of FIG. 5. In comparing the signals and making note of their relative amplitudes it is clear that the result of FIG. 5 would be said to have made a "match". The threshold should be chosen to be greater than the maximum amplitude of FIG. 4 but less than the peak value of the spike of FIG. 5. With respect to this system, the autocorrelation can be accepted as a simulation of the cross-correlation between a stored signature of a physical event and another occurrence of that same event as received by the accelerometer.

Figure 6:
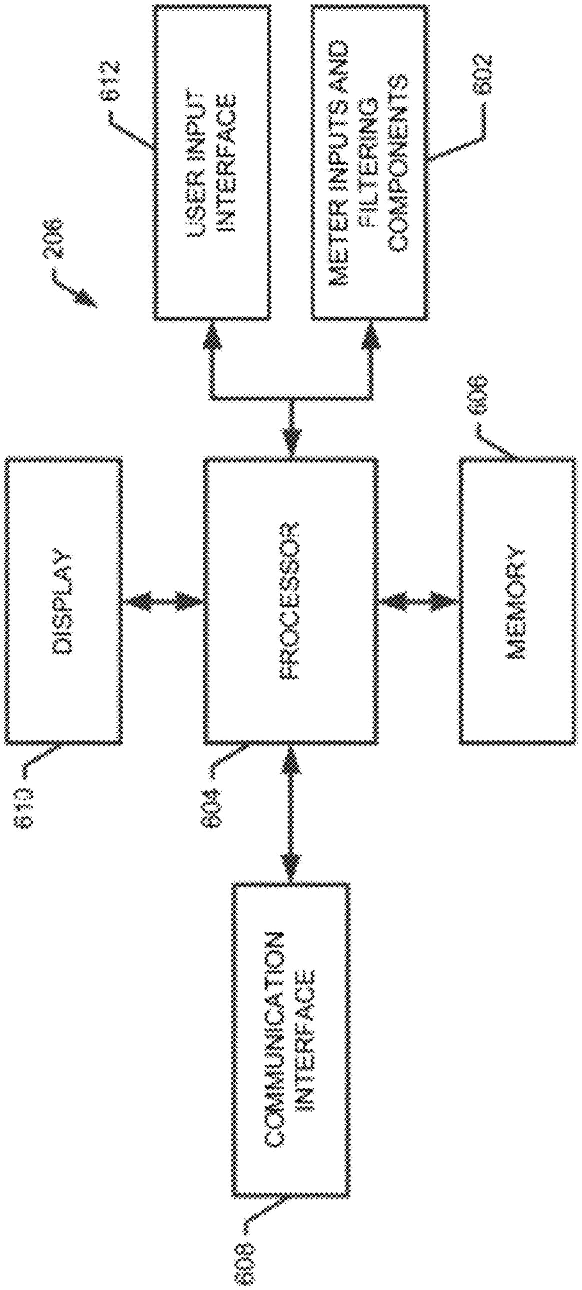
FIG. 6 illustrates a block diagram of an entity capable of operating as a meter electronics in accordance with one embodiment of the present invention.

Referring now to FIG. 6, a block diagram of an entity capable of operating as meter electronics 206 is shown in accordance with one embodiment of the present invention. The entity capable of operating as a meter electronics 206 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a meter electronics 206 can generally include means, such as one or more processors 604 for performing or controlling the various functions of the entity. As shown in FIG. 6, in one embodiment, meter electronics 206 can comprise meter inputs and filtering components 602. In one aspect, the meter inputs and filter components 602 can comprise voltage and current inputs, one or more ADCs, filtering components, and the like. Further comprising this embodiment of meter electronics 206 is a processor 604 and memory 606.

In one embodiment, the one or more processors 604 are in communication with or include memory 606, such as volatile and/or non-volatile memory that stores content, data or the like. For example, the memory 606 may store content transmitted from, and/or received by, the entity. Also for example, the memory 606 may store software applications, instructions or the like for the one or more processors 604 to perform steps associated with operation of the entity in accordance with embodiments of the present invention. In particular, the one or more processors 604 may be configured to perform the processes discussed in more detail herein for receiving an actuation command for a switch, causing a control associated with the switch to implement the actuation, receiving a vibration signal from an accelerometer associated with the switch, and transmitting the vibration signal to a computing device over a network. For example, according to one embodiment the one or more processors 604 can be configured to intermittently store vibration signals from the accelerometer in the memory 606. In one aspect, the one or more processors 604 can be used to determine whether a vibration signal received from the accelerometer meets or exceeds an amplitude or time duration thresholds and send a signal to the computing device 108 over the network 110 if one or both thresholds are met or exceeded.

In addition to the memory 606, the one or more processors 604 can also be connected to at least one interface or other means for displaying, transmitting and/or receiving data, content or the like. In this regard, the interface(s) can include at least one communication interface 608 or other means for transmitting and/or receiving data, content or the like, as well as at least one user interface that can include a display 610 and/or a user input interface 612. In one aspect, the communication interface 108 can be used to transfer at least a portion of the vibration signals stored in the memory 606 to a remote computing device such as the one described below. For example, in one instance the communication interface 608 can be used to transfer at least a portion of the stored vibration signal to a computing device 108 over a communication network 110 so that the transferred vibration signal can be analyzed to determine whether the switch 204 actuated in accordance with an actuation signal. The user input interface 612, in turn, can comprise any of a number of devices allowing the entity to receive data from a user, such as a keypad, a touch display, a joystick or other input device.

Figure 7:
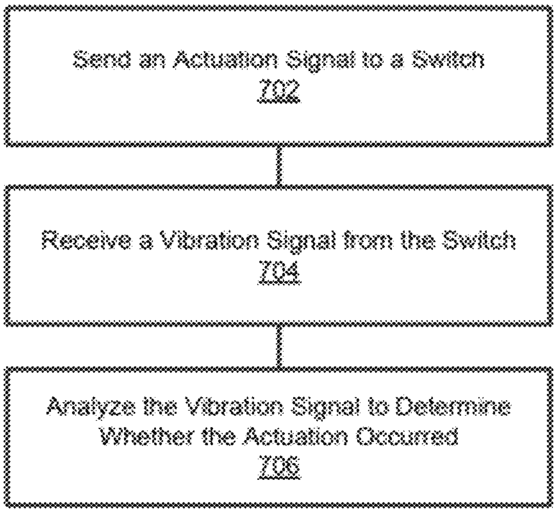
FIG. 7 is a flowchart illustrating the operations taken in order to detect actuation of a switch using vibrations or vibration signatures.

Referring now to FIG. 7, the operations are illustrated that may be taken in order to detect actuation of a switch using vibrations or vibration signatures. At step 702, an actuation signal is sent to a switch. In one aspect, the switch is associated with a meter. In one aspect, the meter is one of an electric, gas or water meter. In one aspect, sending an actuation signal to a switch comprises sending one of an "open" or a "close" signal to the switch. At step 704, a vibration signal is received from the switch. In one aspect, receiving a vibration signal from the switch comprises receiving the vibration signal from an accelerometer associated with the switch. In one aspect, the accelerometer is a MEMS accelerometer. At step 706, the vibration signal is analyzed to determine whether the actuation occurred. In one aspect, determining from the vibration signal whether the actuation occurred comprises analyzing the vibration signal using time-domain analysis to determine whether the actuation occurred. In one aspect, determining from the vibration signal whether the actuation occurred comprises analyzing the vibration signal using frequency-domain analysis to determine whether the actuation occurred. In one aspect, analyzing the vibration signal whether the actuation occurred comprises comparing the vibration signal to one or more known vibration signatures.

Figure 8:
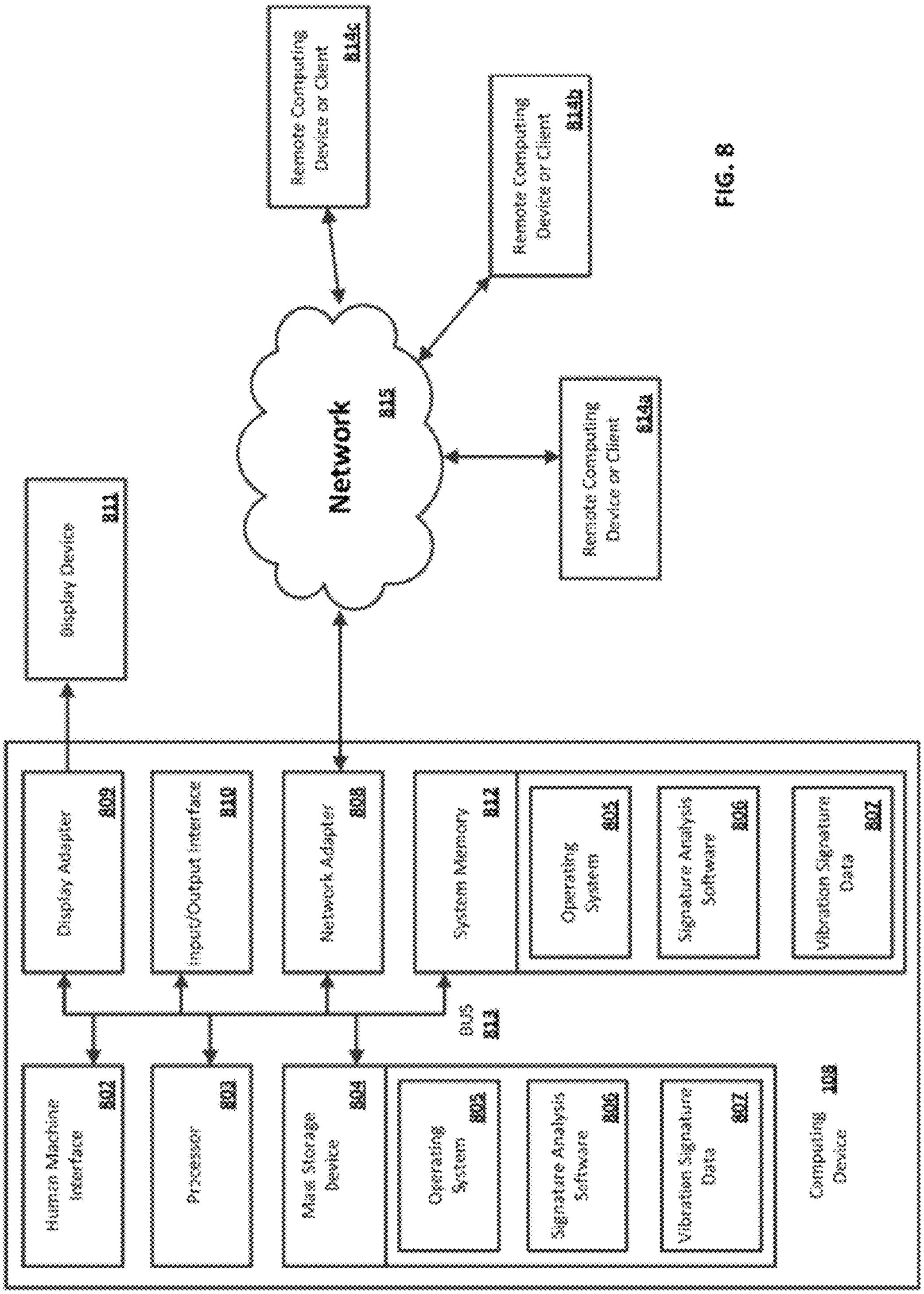
FIG. 8 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit, such as a smart appliance, a smart meter, a smart grid, a utility computing device, a vendor or manufacturer's computing device, etc., can be software, hardware, or a combination of software and hardware. The units can comprise the signature analysis software 806 as illustrated in FIG. 8 and described below. In one exemplary aspect, the units can comprise a computing device 108 as referenced above and further described below.

FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 108. The components of the computing device 108 can comprise, but are not limited to, one or more processors or processing units 803, a system memory 812, and a system bus 813 that couples various system components including the processor 803 to the system memory 812. In the case of multiple processing units 803, the system can utilize parallel computing. In one aspect, the processor 803 is configured to send an actuation signal to the switch, receive the vibration signal from the switch, and determine from the vibration signal whether the actuation occurred.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, signature analysis software 806, vibration signature data 807, a network adapter 808, system memory 812, an Input/Output Interface 810, a display adapter 809, a display device 811, and a human machine interface 802, can be contained within one or more remote computing devices or clients 814*a,b,c* at physically separate locations, connected through buses of this form, in effect implementing a fully distributed system or distributed architecture.

The computing device 108 typically comprises a variety of computer readable media. Exemplary readable media can be any available media that is non-transitory and accessible by the computing device 108 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as vibration signature data 807 and/or program modules such as operating system 805 and signature analysis software 806 that are immediately accessible to and/or are presently operated on by the processing unit 803.

In another aspect, the computing device 108 can also comprise other non-transitory, removable/non-removable, volatile/non-volatile computer storage media. By way of example, FIG. 8 illustrates a mass storage device 804 that can provide non-volatile storage of computer code, computer readable instructions, data structures, program modules, and other data for the computing device 108. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 805 and signature analysis software 806. Each of the operating system 805 and signature analysis software 806 (or some combination thereof) can comprise elements of the programming and the signature analysis software 806. Vibration signature data 807 can also be stored on the mass storage device 804. Vibration signature data 807 can be stored in any of one or more databases known in the art. Examples of such databases comprise, DB2® (IBM Corporation, Armonk, N.Y.), Microsoft® Access, Microsoft® SQL Server, Oracle® (Microsoft Corporation, Bellevue, Wash.), mySQL, PostgreSQL, and the like. The databases can be centralized or distributed across multiple systems.

In another aspect, the user can enter commands and information into the computing device 108 via an input device (not shown). Examples of such input devices comprise, but are not limited to, a keyboard, pointing device (e.g., a “mouse”), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing device 108 can have more than one display adapter 809 and the computing device 108 can have more than one display device 811. For example, a display device can be a monitor, an LCD (Liquid Crystal Display), or a projector. In addition to the display device 811, other output peripheral devices can comprise components such as speakers (not shown) and a printer (not shown), which can be connected to the computer 801 via Input/Output Interface 810. Any step and/or result of the methods can be output in any form to an output device. Such output can be any form of visual representation, including, but not limited to, textual, graphical, animation, audio, tactile, and the like.

The computing device 108 can operate in a networked environment using logical connections to one or more remote computing devices or clients 814*a,b,c*. By way of example, a remote computing device 814 can be a personal computer, portable computer, a server, a router, a network computer, a smart meter, a vendor or manufacture’s computing device, smart grid components, a peer device or other common network node, and so on. Logical connections between the computing device 108 and a remote computing device or client 814*a,b,c* can be made via a local area network (LAN) and a general wide area network (WAN). Such network connections can be through a network adapter 608. A network adapter 808 can be implemented in both wired and wireless environments. Such networking environments are conventional and commonplace in offices, enterprise-wide computer networks, intranets, and other networks 815 such as the Internet.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of signature analysis software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise “computer storage media” and “communications media.” “Computer storage media” comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 803 discussed above with reference to FIG. 8, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., one or more processors 803 of FIG. 8) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:

sending an actuation command via a computing device to a switch associated with a utility service meter;

receiving a vibration signal associated with the switch via the computing device after sending the actuation command, wherein the vibration signal is representative of a switch actuation event; and determining from the vibration signal via the computing device whether the actuation occurred, comprising:

verifying whether the switch actuation event corresponds to the actuation command by comparing the vibration signal to one or more known switch actuation signatures associated with the actuation command.

2. The method of claim 1, wherein the utility service meter is one of an electric meter, a gas meter or a water meter.

3. The method of claim 1, wherein sending an actuation command to the switch comprises sending one of an open or a close signal to the switch.

4. The method of claim 1, wherein receiving a vibration signal associated with the switch comprises receiving the vibration signal from an accelerometer associated with the switch.

5. The method of claim 4, wherein the accelerometer is a MEMS accelerometer.

6. The method of claim 4, wherein receiving a vibration signal associated with the switch comprises receiving the vibration signal when vibrations associated with the switch have an amplitude that meets or exceeds a threshold or met or exceed a specified time duration.

7. The method of claim 1, wherein determining from the vibration signal whether the actuation occurred comprises analyzing the vibration signal using time-domain analysis to determine whether the actuation occurred.

8. The method of claim 7, wherein analyzing the vibration signal using time-domain analysis to determine whether the actuation occurred further comprises filtering the vibration signal prior to analyzing the vibration signal using time-domain analysis.

9. The method of claim 7, wherein analyzing the vibration signal using time-domain analysis comprises using one of cross-correlation or circular cross-correlation to compare the vibration signal with known switch actuation signatures.

10. The method of claim 1, wherein determining from the vibration signal whether the actuation occurred comprises analyzing the vibration signal using frequency-domain analysis to determine whether the actuation occurred.

11. The method of claim 10, wherein analyzing the vibration signal using frequency-domain analysis to determine whether the actuation occurred further comprises filtering the vibration signal prior to analyzing the vibration signal using frequency-domain analysis.

12. A system, comprising:

a meter, wherein said meter is associated with a switch configured to be actuated remotely via an actuation command; and an accelerometer operatively coupled to the meter and configured to detect vibration signals, wherein the vibration signals are detected after the meter receives the actuation command; and verification hardware configured to determine whether an actuation of the switch occurred based at least on a comparison of the vibration signals to one or more known switch actuation signatures associated with the actuation command.

13. The system of claim 12, further comprising a transmitter and a computing device, wherein the transmitter is used to transmit the vibration signal to the computing device and the computing device is used to compare the vibration signal with known switch actuation signatures to determine whether actuation of the switch occurred.

14. The system of claim 13, wherein the computing device is configure to actuate the switch remotely by sending one of an open or a close signal to the meter and the meter sends the signal to the switch.

15. The system of claim 14, wherein the computing device configured to receive a vibration signal associated with the switch comprises the computing device configured to receive the vibration signal when vibrations associated with the switch have an amplitude that meets or exceeds a threshold or met or exceed a specified time duration.

16. The system of claim 12, wherein the accelerometer is a MEMS accelerometer.

17. The system of claim 12, wherein the meter is one of an electric meter, a gas meter or a water meter.

18. The system of claim 12, wherein the vibration signal is analyzed using frequency-domain analysis to determine whether the actuation occurred.

19. The system of claim 18, wherein the system further comprises a filter and analyzing the vibration signal using frequency-domain analysis to determine whether the actuation occurred further comprises filtering the vibration signal using the filter prior to analyzing the vibration signal using frequency-domain analysis.

20. The system of claim 12, wherein the vibration signal is analyzed using time-domain analysis to determine whether the actuation occurred.

21. The system of claim 20, wherein the system further comprises a filter and analyzing the vibration signal using time-domain analysis to determine whether the actuation occurred further comprises filtering the vibration signal using the filter prior to analyzing the vibration signal using time-domain analysis.

22. The system of claim 20, wherein analyzing the vibration signal using time-domain analysis comprises using one of cross-correlation or circular cross-correlation to compare the vibration signal with known switch actuation signatures.

23. A system, comprising:

a non-transitory computer readable medium storing computer executable instructions which, when executed by a computer, perform a process comprising:

sending an actuation command to remotely actuate a switch;

determining one or more switch actuation signatures associated with the actuation command;

receiving a vibration signal produced by an accelerometer in proximity to the switch, wherein the vibration signal is associated with the actuation of the switch; and verifying based at least on a comparison of the vibration signal and the one or more switch actuation signatures associated with the actuation command whether the actuation occurred.

24. The system of claim 23, wherein the accelerometer is a MEMS accelerometer.

25. The system of claim 23, wherein the meter is one of an electric meter, a gas meter or a water meter.

26. The system of claim 23, wherein sending an actuation command to remotely actuate a switch comprises sending one of an open or a close signal to the switch.

27. The system of claim 23, wherein verifying based at least on the vibration signal and the one or more switch actuation signatures whether the actuation occurred comprises analyzing the vibration signal using time-domain analysis to determine whether the actuation occurred.

28. The system of claim 27, wherein the system further comprises a filter and analyzing the vibration signal using time-domain analysis to verify whether the actuation occurred further comprises filtering the vibration signal using the filter prior to analyzing the vibration signal using time-domain analysis.

29. The system of claim 27, wherein analyzing the vibration signal using time-domain analysis comprises using one of cross-correlation or circular cross-correlation to compare the vibration signal with the one or more switch actuation signatures.

30. The system of claim 23, wherein verifying based at least on the vibration signal and the one or more switch actuation signatures whether the actuation occurred comprises analyzing the vibration signal using frequency-domain analysis to determine whether the actuation occurred.

31. The system of claim 30, wherein the system further comprises a filter and analyzing the vibration signal using frequency-domain analysis to verify whether the actuation occurred further comprises filtering the vibration signal using the filter prior to analyzing the vibration signal using frequency-domain analysis.

* * * * *